United States Patent
Singh et al.

(10) Patent No.: US 10,846,210 B1
(45) Date of Patent: Nov. 24, 2020

(54) AUTOMATION OF PLATFORM RELEASE

(71) Applicant: Capital One Services, LLC, McLean, VA (US)

(72) Inventors: Bijender Singh, Glen Allen, VA (US); Srinivas Alladi, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/669,642

(22) Filed: Oct. 31, 2019

(51) Int. Cl.
*G06F 11/36* (2006.01)
*G06Q 20/40* (2012.01)
*G06F 8/71* (2018.01)

(52) U.S. Cl.
CPC .......... *G06F 11/3688* (2013.01); *G06F 8/71* (2013.01); *G06F 11/3692* (2013.01); *G06Q 20/4016* (2013.01)

(58) Field of Classification Search
CPC ................................................. G06F 11/3688
USPC ........................................................ 717/122
See application file for complete search history.

(56) References Cited

U.S. PATENT DOCUMENTS

| | | | |
|---|---|---|---|
| 2002/0066077 A1* | 5/2002 | Leung | G06F 11/368 717/126 |
| 2015/0370685 A1* | 12/2015 | Heymann | G06F 11/368 714/38.1 |
| 2016/0048391 A1* | 2/2016 | Somani | G06F 11/368 717/101 |
| 2018/0321918 A1* | 11/2018 | McClory | H04L 41/5041 |
| 2019/0220262 A1* | 7/2019 | Fox | G06F 8/41 |
| 2019/0243640 A1* | 8/2019 | Natari | G06F 8/60 |
| 2019/0243742 A1* | 8/2019 | Natari | G06F 11/3608 |
| 2019/0310929 A1* | 10/2019 | Wright | G06F 8/65 |
| 2019/0317887 A1* | 10/2019 | Wiener | G06F 9/44526 |

* cited by examiner

*Primary Examiner* — John Q Chavis
(74) *Attorney, Agent, or Firm* — Banner & Witcoff, Ltd.

(57) ABSTRACT

Aspects described herein may relate to methods, systems, and apparatuses that combine one or more versions of different software application components of a software platform with a new version of a software component in order to perform an integration test. The combination may be tested in an integration test plan by utilizing versions of the one or more versions of different software application components of the software platform that previously passed the integration test plan. Notification of a failure of the integration testing may be sent back to an applicable developer for correction while the one or more versions of different software application components are maintained.

20 Claims, 5 Drawing Sheets

AUTOMATION OF PLATFORM RELEASE

FIELD OF USE

Aspects of the disclosure relate generally to software platform testing. More specifically, aspects of the disclosure may provide improved techniques for testing separate components of a software application and maintaining those components that pass an integration plan for the software platform.

BACKGROUND

There are numerous challenges to ensuring individual software applications are integrated properly into a computing environment for eventual inclusion in a software platform release. For example, a company may seek to release a new version of a software platform based upon consumer requests, problems associated with a current version, and/or other factors. A company may accumulate requests for changes to or new features for a software platform as part of a development cycle. Alternatively, such a company may seek to release an entirely new software platform. If a development cycle moves forward, the new software platform release is planned and designed. A testing or quality assurance phase occurs in which the software application release is built, tested, retested, and tweaked until it meets any applicable requirements to be a release candidate. The software platform release then enters a deployment phase, where it is implemented and made available to applicable consumers. Once deployed, the software application release enters a support phase, where bug reports and other issues and requests are collected. When deciding to address any of these bug reports or other issues and requests, new requests for changes may be received, and the cycle starts again for a new software platform release.

Aspects described herein may address these and other problems associated with such a process, and generally improve the process for automated release of a software platform.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may address one or more inadequacies of software application integration and testing of a software platform release based on a change to one or more software applications of the software platform. Further, aspects described herein may address one or more other problems, and may generally improve systems that perform software application integration and/or testing of a software platform release based on a change to one or more software applications of the software platform.

For example, aspects described herein may relate to the processing of one or more software applications associated with a software platform release and testing the software platform based on the integration of the one or more software applications. Processing the one or more software applications may include receiving a new version of a first software application for potential integration within a software platform that includes multiple software applications. The new version may be tested to ensure that it can be integrated into the software platform in a sufficient manner.

Additional aspects described herein may relate to implementing the processing and testing mentioned above in a computing environment. For example, the processing of a new version of a software application may include combining the new version of the software application with a previously tested version of a second software application that is included within the software platform. In another example, the new version of the software application may be combined with a plurality of other software applications, each of which previously passed a testing process for an integration plan associated with the software platform. In yet another example, the new version of the software application may be combined with a plurality of other software applications, some of which previously passed a testing process for an integration plan associated with the software platform. When determined to have failed a testing process, a notification may be sent to one or more developers of the new version of the software application that the integration testing failed and may include the particular step of a sequence of test steps that the new version failed. This may allow for an enterprise to implement a standardized testing policy for integration test plans.

Corresponding apparatuses, systems, and computer-readable media are also within the scope of the disclosure. These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
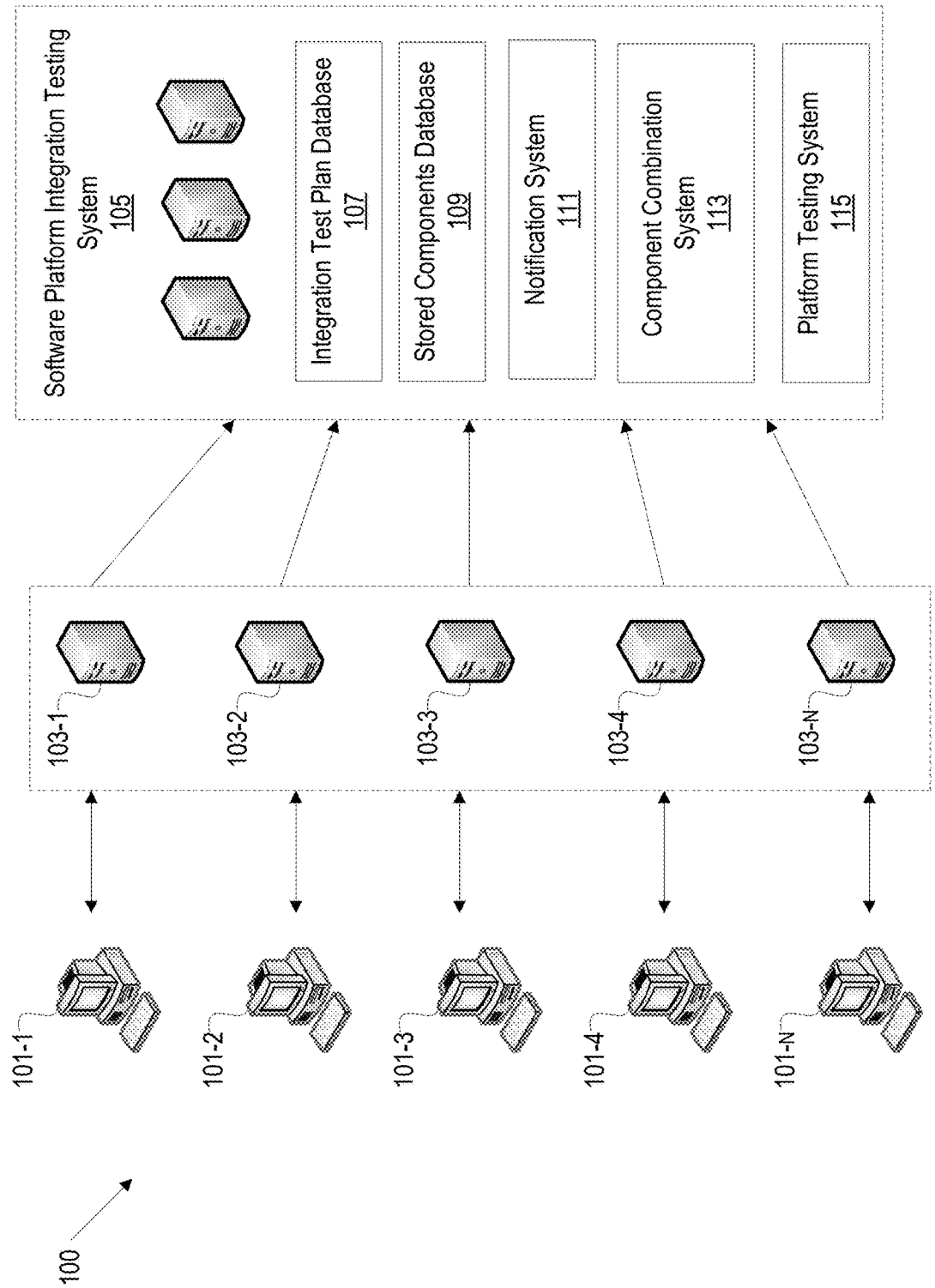
FIG. 1 depicts a block diagram of an example computing environment that may be configured to implement software application integration and testing of a software platform.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for testing an application as part of an integration process into a software platform for eventual release. Prior to testing the application as part of an integration plan, individual software applications that are components of a software platform for release may be individually tested to meet a developer's requirements for integration testing. As developer's complete testing on new features that are part of an individual software application component, that current version of the software application may be the one being tested for integration. Once tested as a component, the application software may be combined with one or more software application components that previously passed an integration test plan for the software platform. The combination of the software application component for testing and the one or more software applications that previously passed the integration test plan for the software platform may then be tested as part of the integration test plan for the software platform. Results of the integration testing may be sent as a notification to one or more developers associated with the software application being tested. Since the other software application components that were part of the combination being tested were the one or more software application components that previously passed the integration test plan for the software platform, a passing of the integration test ensures that the tested software application integrated properly. If a failure of the integration test plan, a notification may indicate the failure of the tested software application and the particulars of the failure itself.

Based on methods and techniques described herein, a software platform may be tested as new versions of software application components of the software platform need to be tested. By using previously passed versions of other software application components that are part of the software platform when testing the software application with the new versions of the software application components, any failure of the integration test plan may be attributable to the new versions of the tested software applications. In this way, software application component integration testing may be improved by, for example, identifying the individual software applications of a software platform that failed to meet the requirements of the integration test plan of the software platform. Additional examples of these aspects, and others, will be discussed below in connection with FIGS. 1-5.

FIG. 1 depicts a block diagram of an example computing environment that may be configured to implement application integration and testing of a software platform. As a brief overview, the example framework 100 of FIG. 1 illustrates a process where a software application for incorporation within a software platform may be received from a computing device source, which is indicated by computing device 101-1. Framework 100 is shown with a plurality of computing devices 101-1, 101-2, 101-3, 101-4, and 101-$_N$. Each of these computing devices sources may be one or more computing devices of a developer tasked with preparation of a software application component for inclusion in a software platform. The software platform may be software, such as an operating system, an operating environment, and/or a database that allows for other application programs to operate within. There are many types of software platforms including technology platforms (e.g., Amazon Web Services and Microsoft Azure), computing platforms (e.g., Apple iOS and Microsoft Windows), marketplace platforms (e.g., eBay and Amazon Marketplace), on-demand service platforms (e.g., Uber and Lyft), content crowdsourcing platforms (e.g., YouTube and TripAdvisor), data harvesting platforms (e.g., Waze and OpenSignal), utility platforms (Google Search and Kayak), and interaction network platforms (e.g., Facebook and Bitcoin). A software platform may include a number of underlying software applications that, when combined together, allow the software platform to operate for its intended purposes with its intended features, such as to enable transactions between buyers and sellers for marketplace platforms.

In an example marketplace platform, the software platform may be designed to include five underlying software application components that, when combined together, enable transactional processes to occur over a network, such as the Internet. For example, each of the computing devices 101-1 through 101-$_N$ may be a different one of these five software application components. Computing device 101-1 may be used by a developer tasked to develop a user registration and authentication/login component for the marketplace type software platform. Similarly, each of computing devices 101-2 through 101-$_N$ may be used by the same or a different developer tasked to develop a different software application component for the marketplace software platform. Computing device 101-2 may be used by a developer tasked to develop a product catalog component. Computing device 101-3 may be used by a developer tasked to develop a shopping cart component. Computing device 101-4 may be used by a developer tasked to develop a billing and payment gateway component, and computing device 101-$_N$ may be used by a developer tasked to develop a shipping component for the marketplace type software platform.

Each of the respective developers may code the functionality for the respective software application component on the respective computing device 101-1, 101-2, 101-3, 101-4, or 101-$_N$. Prior to implementing an integration test plan to determine whether a plurality of the software application components can operate together in the intended manner, each of the respective software application components may be tested by the respective developer. FIG. 1 shows one or more software application component testing devices 103-1, 103-2, 103-3, 103-4, and 103-$_N$. The individual functionalities of the respective software application component may be tested, using a respective software application component testing device to identify bug and other defects. A developer for a software application component using computing device 101-1 may send the software application component to software application component testing device 103-1 for testing. Any identified bugs and/or defects may be identified and a notification may be sent back to the respective developer for correction as needed. This process may continue until the notification by the respective software application component testing device indicates that the software application component is complete for the desired individual functionality. Accordingly, the functionality of the software application component has been verified in isolation from any other software application component of a software platform.

As described herein, when a software application component has passed component testing on the functionality of the individual software application component, a developer may transition to have the software application component tested as part of an integration test plan to determine whether the software application component properly works with other software application components for a software platform. Such an integration test plan may include one or more sequences of test steps designed to ensure that a particular software application component and/or a combination of software application components work properly as a combined group of software application components that make up the software platform. As in the previously described example, a software application component for user registration and authentication/login may be tested with the other software application components for a product catalogue, a shopping cart, a billing and payment gateway, and shipping. Prior to a release of a software platform, developers may want to ensure a proper functionality operation of the various software application components together. Integration testing may be used to ensure this proper operation as a group.

FIG. 1 shows a software platform integration testing system 105. Software platform integration testing system 105 may test a combination of software application components to ensure that the combination meets the requirements of an integration test plan for a software platform. Software platform integration testing system 105 may be one or more computing devices configured to operate as described herein. Software platform integration testing system 105 includes an integration test plan database 107. Integration test plan database 107 may include one or more test plans for testing a plurality of software application components together to ensure a proper integration of the plurality of software application components for a software platform. The one or more test plans of the integration test plan database 107 may include one or more sequences of test steps that are performed on a plurality of software application components that have been combined.

As part of an integration testing process, the software platform integration testing system 105 may determine which of the one or more integration test plans within the integration test plan database 107 to utilize. Alternatively, a user, such as an integration tester and/or a developer, may determine which of the one or more integration test plans within the integration test plan database 107 to utilize. Still further such a user, in combination with the software platform integration testing system 105, may determine which of the one or more integration test plans within the integration test plan database 107 to utilize. For example, a user may want to test a particular aspect of the combined plurality of software application components to test, such as when a user has been authenticated, does the combined plurality of software application components properly auto-load a billing address and a shipping address for the user when a purchase is made. Each of these processes for auto-loading may be implemented by the respective software application components, but a tester may want to ensure that the combination of software application components works properly together. In such an example, the user may select to a test plan that meets that goal and the software platform integration testing system 105 further may determine which, if there are a number of test plans that meet this goal, test plan to utilize.

Software platform integration testing system 105 includes a component combination system 113. Component combination system 113 may combine a new version of a software application component, which is ready for integration testing, with one or more software application components that previously passed one or more sequences of test steps defined in a determined integration test plan that is to be utilized for testing the new version of the software application component with the other software application components. These other software application components that previously passed the one or more sequences of test steps defined in the determined integration test plan may be stored in a stored components database 109. Stored components database 109 may maintain the most recent versions of various software application components that previously passed an integration test plan for a software platform.

For the example in FIG. 1, a developer may have a new version of a software application component ready to be subject to component testing. The software application component may be for a product catalog component of the software platform. The developer, using computing device 101-2, may have the software application component tested using software application component testing devices 103-2. Once component testing has passed, the version of the software application component may be sent to the software platform integration testing system 105. Component combination system 113 combines the new version of the software application component with one or more stored software application components of the software platform to generate a test version. The component combination system 113 may retrieve the one or more stored software application components from the stored components database 109. The one or more stored software application components retrieved from stored component database 109 may be software application components for user registration and authentication/login, a shopping cart, a billing and payment gateway, and shipping. Each of these versions of the software application components passed the integration test plan for the software platform. Accordingly, component combination system 113 combines the new version of a software application component with the previously passed versions of one or more different software application components to generate a test version for integration testing. Stored components database 109 may maintain one or more versions of a previously passed version of a software application component. Stored components database 109 further may maintain one or more passed versions of the software platform as a combination of each of the respective software application components that passed an integration test plan.

Software platform integration testing system 105 further may include a platform testing system 115. Platform testing system 115 may perform one or more sequences of test steps defined in an integration test plan on a combined version of application software components of a software platform. Platform testing system 115 may retrieve or determine and retrieve a particular integration test plan of a software platform to utilize for testing a combined version of application software components of the software application. Platform testing system 115 may retrieve the particular integration test plan from integration test database 107. With the combined version of the software application components for testing and the particular integration test plan to utilize, platform testing system 115 may determine whether the combined version of application software components passed one or more sequences of test steps defined in the particular integration test plan of the software platform. Accordingly, the platform testing system 115 may be utilized to ensure that the software platform as a whole functionally operates as expected.

FIG. 1 further shows the software platform integration testing system 105 including a notification system 111. Notification system 111 may send a notification of the results of the platform testing to a computing device. Notification system 111 may send such a notification to a computing device of a developer, such as computing device 101-2. The notification may include data representative of the new version of the software application component as having failed the one or more sequence of test steps defined in the particular integration plan. For example, with a marketplace type software platform, the platform testing system 115 may determine that a user's address did not automatically populate applicable fields of a shipping software application component, such as one developed by a developer on computing device 101-$_N$. If the new version of the software application component in the test version was a new version of the shipping software application component, the notification may be sent by the notification system 111 to a developer and/or computing device associated with the development of that software application component, i.e., computing device 101-$_N$.

However, the failure of a user's address automatically being populated in applicable fields of the shipping software application component may not be an error of the shipping software application component. Rather, the error may be due to the user registration and authentication/login software application component. Thus, if the new version of the software application component in the test version was a new version of the user registration and authentication/login software application component, the notification may be sent by the notification system 111 to a developer and/or computing device associated with the development of the user registration and authentication/login software application component, i.e., computing device 101-1. Because the platform testing system 115 is using a new version of a software application component combined with one or more versions of other software application components that previously passed the integration test plan, the platform testing system 115 may determine that any error is a fault of the new version of the software application component and may send a notification only to the applicable individuals and/or computing devices associated with that software application component.

In a case where the new version of the application software component is determined by the platform testing system 115 to have failed the one or more sequences of test steps of the integration test plan, a prior version of the new version of the software application component may be maintained. Such a prior version may be maintained in the stored component database. This prior version previously passed the one or more sequence of test steps of the integration test plan. Accordingly, if a different software application component of the software platform needs testing, the stored prior version may be utilized as part of the plurality of software applications combined with the different software application component and any result of a failure may similarly be associated with the different software application component and not the stored prior version. Thus, once at least one version of each of the software application components of a software platform has passed an integration test plan, each version of the individual software application components may be stored in stored components database 109 and used for testing new versions of individual software application components.

Figure 2:
FIG. 2 depicts a block diagram of an example computing environment that may be configured to implement software application integration and testing of a software platform that is arranged as a pipeline.

The example framework 100 of FIG. 1 may be used in a number of computing environments. One example computing environment is an enterprise computing environment that, among other things, develops and test software applications for an enterprise. The example framework 100 may be incorporated into an enterprise computing environment to develop various software application components of a software platform and to test them for functionality operation prior to a release of the software platform. Further, the example framework 100 may be incorporated into an enterprise computing environment to allow for an enterprise to implement a standardized testing policy for software application components. FIG. 2 depicts a block diagram of an enterprise computing environment 200 that may be configured to implement software application integration and testing of a software platform in accordance with one or more aspects described herein.

The example enterprise computing environment 200 of FIG. 2 includes a plurality of different software application components, which are depicted as software application component 1 201-1 through software application component N 201-$_N$; a plurality of component testing devices 203-1 through 203-$_N$, which may be merely one component test device for the enterprise; a database 207 configured to store one or more integration test plans, which may be one of many databases for the enterprise; a stored components database 209 configured to store one or more versions of software application components that previously passed one or more integration test plans, which may be one of many databases for the enterprise; a software platform integration testing device 205 that is configured to operate as the component combination system 113 and the software platform testing system 115 of FIG. 1; and a notification of results device 211, which may send a result of an integration test plan to a developer.

At an arbitrary time, anew version of one or more software application components may be introduced to the enterprise computing environment 200. As depicted in FIG. 2, software application component 2 201-2 may be introduced, such as through a computing device, such as computing device 101-2 in FIG. 1. The computing device may be internal to the enterprise (e.g., a computing device being used by an employee of the enterprise via a VPN or a local intranet) or may be external to the enterprise (e.g., a computing device of a third-party entity that sends, via a public network, the software application component 2 201-2 to the enterprise computing environment 200).

Based on the introduction of the software application component 2 201-2 to the enterprise computing environment 200, the software application component 2 201-2 may be subjected to component testing 203-2. Component testing 203-2 may include a software application component testing device, such as software application component test device 103-2 in FIG. 1. Once component testing has passed, the version of the software application component 2 201-2 may be sent to software platform integration testing 205. Accordingly, as depicted in FIG. 2, the software platform integration testing 205 may receive the software application component 2 201-2 after component testing 203-2 via a computing device.

In an alternative embodiment, the new version of one or more software application components may be introduced to the software platform integration testing 205 after component testing. A software application component 2 201-2 that has passed component testing may be introduced, such as through a computing device, such as software application component testing device 103-2 in FIG. 1. The computing device may be internal to the enterprise (e.g., a computing device being used by an employee of the enterprise via a VPN or a local intranet) or may be external to the enterprise (e.g., a computing device of a third-party entity that sends, via a public network, the software application component 2 201-2 that has already passed component testing to the enterprise computing environment 200). In yet other examples, a plurality of software application components, such as software application components 1 201-1 and 2 201-2, may be introduced to the enterprise computing environment 200 and/or a plurality of software application components, such as software application components 1

201-1 and 2 201-2, that have already passed component testing may be introduced to the enterprise computing environment 200.

As also depicted in FIG. 2, the software platform testing 205 may be configured to initiate one or more sequence of steps to test software platform integration. For example, the software platform testing 205 may be configured to perform one or more sequences of test steps defined in an integration test plan for a software platform. Software platform testing 205 may be configured to ensure that all software application components of a version of a software platform functionally operate correctly. The integration test plan may be configured to test one or more software application components interacting with one or more other software application components. For example, an integration test plan maintained in integration test plan 207 may be a test plan to test the functionality of one particular software application component when data is provided to and/or data is received from a different software application component. In another example, an integration test plan maintained in integration test plan 207 may be a test plan to test the functionality of multiple software application components interacting together as part of the software platform.

Software platform testing 205 may be configured to utilize one or more stored software application components 209, such as stored software application components within stored components database 109 in FIG. 1. The stored software application components 209 represent one or more versions of one or more software application components that have previously passed one or more integration test plans of the software platform. As each new version of a software application component is tested as part of an integration test, if the new version of the software application component being tested passes, that new version may be stored in the stored components 209 as a version having passed the integration test plan of the software platform. If a previous version of the same software application component is maintained within stored components 209, the previous version also may be maintained or the previous version may be removed from storage. In such an example of the previous version being deleted, stored components 209 may maintain only one version of each of a plurality of software application components that have previously passed an integration test plan of the software platform. Stored components 209 may be maintained within an enterprise environment and/or may be maintained outside of an enterprise environment by a third-party.

Notification of results 211 provides a notification to a user and/or computing device as to the result of an integration test plan performed on a new version of a software application component. Such a notification may include data on one or more particular test steps of one or more sequences of test steps that the new version of the software application component failed. Such a notification may concurrently or alternatively include data on one or more particular test steps of the one or more sequences of test steps that the new version of the software application component passed. Notification of results 211 may send the notification of results to a user, such as a developer, associated with the new version of the software application component being tested in the integration test plan. Because the integration test plan utilizes stored software application components that have previously passed the integration test plan, any failure of the integration test plan may be attributable to the new version of the software application component being tested since any previous version of such a software application component previously passed such an integration test plan.

In some situations, two or more new versions of software application components may be needed to be tested at the same time in an integration test plan. In such a configuration, aspects described herein may operate in much of the similar manner. For example, in FIG. 2 there may be a new version of software application component 3 201-3 and software application component 6 201-6 having passed component testing and ready for integration testing. In such an example, the new versions of each of software application component 3 201-3 and software application component 6 201-6, having already passed individual component 3 testing 201-3 and component 6 testing 203-6, may be sent to software platform integration testing 205. Software application integration testing 205 may include retrieving the remaining software application components of the software platform from stored software application components 209.

In this example, the software platform may include eight software application components and the other six software application components (corresponding to stored version of software application component 1 201-1, software application component 2 201-2, software application component 4 201-4, software application component 5 201-5, software application component 7 201-7, and software application component N 201-$_N$) would be retrieved from software application components 209 as previous versions of each software application component that previously passed one or more integration test plan for the software platform. Accordingly, when the integration test plan is determined form integration test plan 207 and utilized by software platform integration testing 205, any failure of the integration test plan is attributable to one or both of software application component 3 201-3 or software application component 6 201-6, since each of these two versions of a software application component had not previously passed the integration test. Since being tested with versions of other software application components that have passed the integration test plan, the failure to pass the test plan is due to one or both of these software application components. Thereafter a notification may be sent to a developer and/or associated computing device to each of the new versions of the software application component 3 201-3 and software application component 6 201-6 to notify of the failure. Alternatively, if the integration test plan is passed, each of the two new versions of the software application component 3 201-3 and software application component 6 201-6 may be stored in stored component 209.

Figure 3:
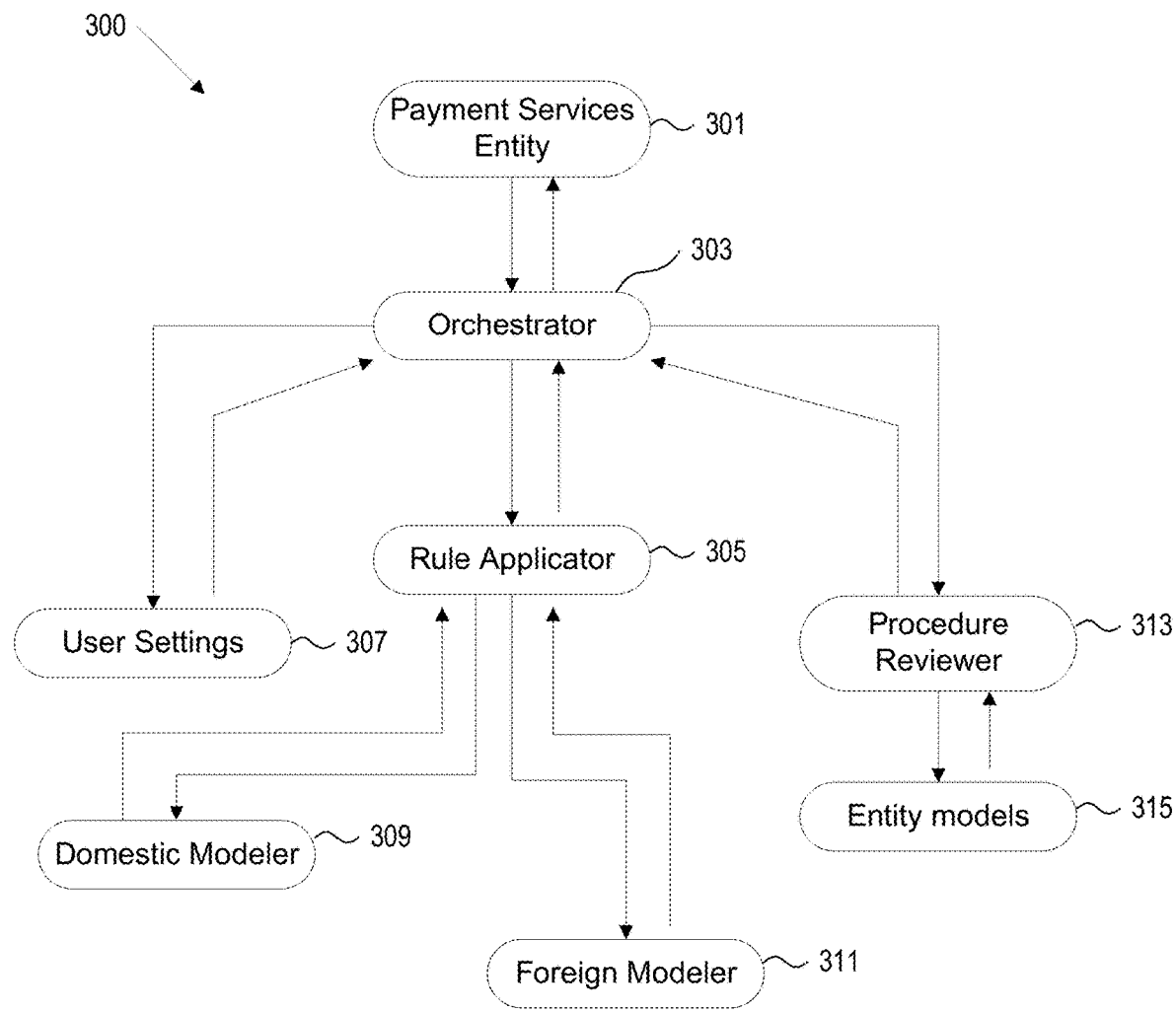
FIG. 3 depicts an example diagram of a plurality of software applications that are part of a software platform.

FIG. 3 depicts an example diagram 300 of a plurality of software applications that are part of a software platform. FIG. 3 illustrates an example of a software platform that includes eight different software application components. Example diagram 300 includes an orchestrator software application component 303. Orchestrator software application component 303 may be configured to take an authorization from a payment services entity software application component 301 and coordinate the distribution of any data in accordance with the same to other software application components. Orchestrator software application component 303 further may be configured to determine a decision from a plurality of decisions received from various other software application components, such as user settings software application component 307, rule applicator software application component 305, and procedure reviewer software application component 313. User settings software application component 307 may be configured to handle virtual tokens and personal features of a user, such as a blocking and unblocking credit cards. Rule applicator software application component 305 may be configured to run fraud rules on authorizations from the payment services entity software application component 301. Rule applicator software application component 305 further may be configured to make one or more fraud decisions and send data back to orchestrator software application component 303.

Domestic modeler software application component 309 and foreign modeler software application component 311 may be software application components that are configured to calculate model scores for a user based upon domestic, such as US, model conditions taking into account requirements and aspects of US practice and based upon foreign, such as Canada, model conditions taking into account requirements and aspects of Canadian practice, respectively. Once domestic modeler software application component 309 or foreign modeler software application component 311 calculates a respective score, the data may be sent back to rule applicator software application component 305. Procedure reviewer software application component 313 may be configured to handle credit rules, such as what conditions allow for credit extended over a limit, what is the response to limiting free credit cards, etc. Decisions by the procedure reviewer software application component 313 may be sent back to orchestrator software application component 303. Finally, entity models software application component 315 may be configured to handle authorizations specific to a type of credit card, such as a small business type of credit card. Decisions from entity models software application component 315 may be sent back to procedure reviewer software application component 313.

For each of these eight illustrative software application components in diagram 300, data inputs and/or data outputs may exist requiring interaction between the software application components as a whole, as part of a software platform, to function properly. The eight illustrative software application components in diagram 300 may correspond to software application components 1 201-1 through N 201-$_N$ in FIG. 2. Should one of the software application components in diagram 300, such as user settings software application component 307, have a new version developed by a developer that passing component testing, such as component testing 203-4 in FIG. 2, the new version may be combined with previously passed stored software application components 209 for the other seven software applications components in FIG. 3. The combined software application components generate a new test version that software platform integration testing 205 tests based upon an integration test plan 207. If the test version passes the integration testing, a notification may be sent that the software application component passed the plan and the new version may be stored in stored software application components 209. If the test version failed the integration test plan testing, a notification of results 211 may be sent to the developer to indicate the failure of the new version and may include the particular step of a sequence of test steps that the new version failed.

Figure 4:
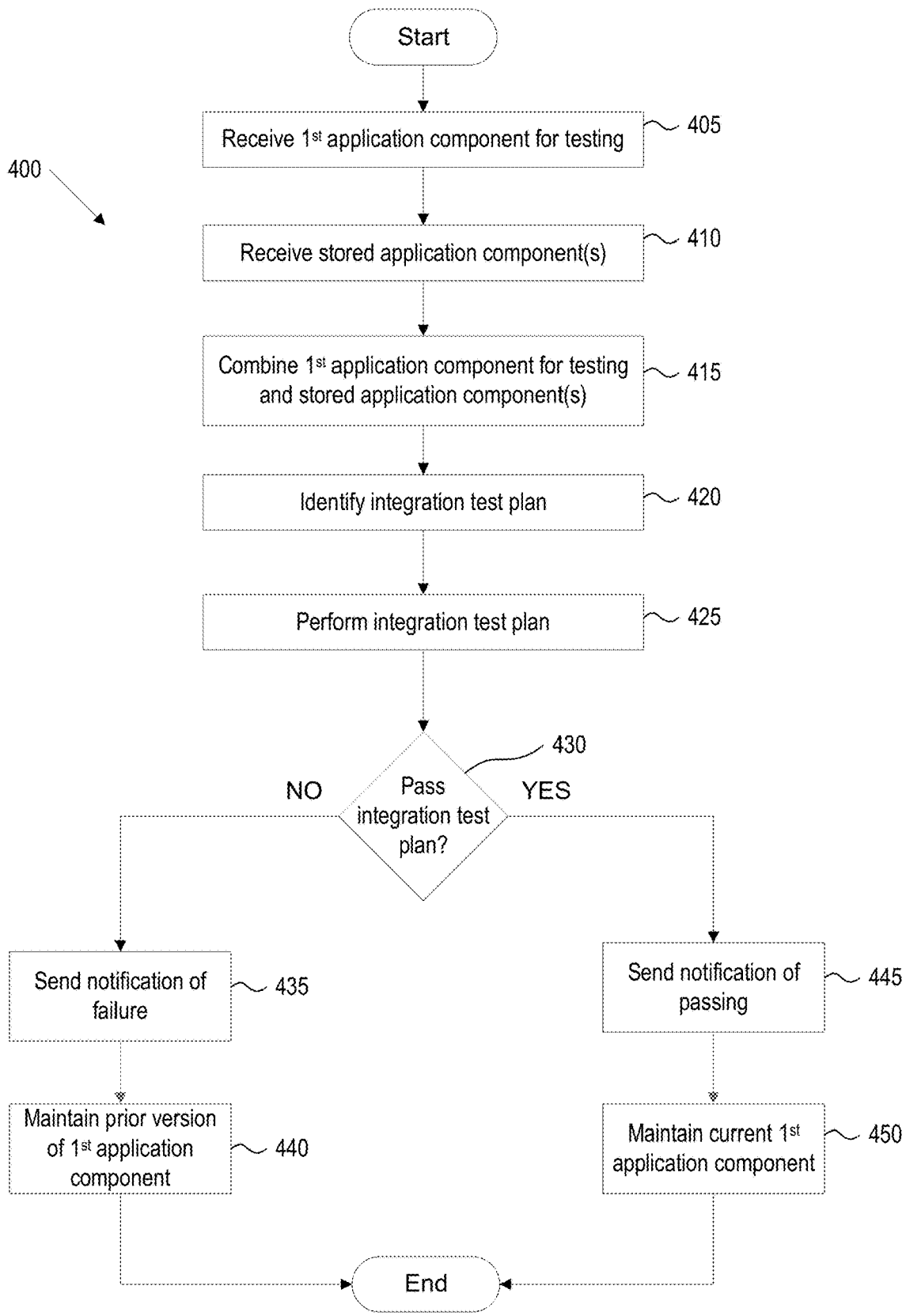
FIG. 4 depicts an example method that may test software application integration and testing of a software platform.

Having discussed the example framework 100 of FIG. 1 and the example enterprise computing environment 200 of FIG. 2, example methods that may be performed by one or more computing devices based on the example framework 100 and/or as part of the example enterprise computing environment 200 will be discussed. The example methods are depicted at FIG. 4. FIG. 4 depicts an example method that may test software application integration and testing of a software platform.

Method 400 may be implemented by one or more suitable computing devices, as described herein. For example, method 400 may be implemented by a computing device (e.g., software platform integration testing system 105, platform testing system 115, software platform integration testing 205, and/or any one of computing devices 501, 505, 507, and 509 of FIG. 5), and/or combination of computing devices (e.g., a combination of software platform integration testing system 105 and any other device of the enterprise computing environment 200, and/or a combination of computing devices 501, 505, 507, and 509 of FIG. 5). Method 400 may be implemented in suitable computer-executable instructions, such as in component processing software 527 and/or component testing software 529. Method 400 may also include access of one or more databases, such as integration test plan database 107 and stored software application components database 109 of FIG. 1. The integration test plan database and/or the stored software application component database 109 may be stored as component processing data 527 and/or component testing data 529 of FIG. 5 or as part of some other database.

Returning to FIG. 4, method 400 starts with receipt of a first version of a software application component for testing in step 405. In one example with respect to FIG. 1, software platform testing system 115 may be configured to perform step 405 and may receive the first version of the software application component for testing from software application component testing device 103-1. Proceeding to step 410, one or more stored software application components may be received. If the software application includes five different software application components, step 410 may include receiving four software application components. Software platform testing system 115 may be configured to perform step 410 and may receive the stored one or more software application components from stored software application component database 109. Each of the received stored software application components is a version of the applicable software application component that previously passed an integration test plan for the software platform.

In step 415, the first version of the software application component for testing received in step 405 is combined with the one or more stored software application components received in step 410. The combination step 415 combines the first version of the software application component for testing with the one or more stored software application components of the software platform to generate a test version of the software platform for integration testing. Software application component combination system 113 may be configured to perform step 415 and may send the test version to software platform testing system 115. Proceeding to step 420, an integration test plan may be identified for testing of the test version of the software platform. Software platform testing system 115 may be configured to perform step 420 and may access one or more integration test plans within integration test plan database 107 to identify an integration test plan to utilize for testing the test version of the software platform.

Moving to step 425, an integration test plan is performed on the test version of the software platform. The integration test plan is the integration test plan identified in step 420. Software platform testing system 115 may be configured to perform step 425 based upon the test version from software application component combination system 113 and the identified integration test plan from integration test plan database 107. Platform testing system 115 may determine whether the test version passed one or more sequences of test steps defined in the integration test plan of the software platform. Proceeding to step 435, a determination is made as to whether the test version passed the one or more sequences of test steps defined in the integration test plan. Software platform testing system 115 may be configured to perform step 430 by identifying one or more errors when testing the test version in step 425.

If the test version failed the integration test plan in step 430, the method moves to step 435 where a notification may be sent to indicate the failure of the test version of the software platform. Such a notification may include identification of the first version of the software application component received in step 405 and one or more test steps of the integration test plan that the first version of the software application component failed. Notification system 111 may perform step 435 in response to data received from software platform testing system 115. Because the first version of the software application component for testing that was received in step 405 has been determined to fail the integration test plan, in step 440, one or more prior versions of the same software application component that was tested is maintained. The one or more prior versions of the same software application component may be maintained in stored software application components database 109. Each of the one or more prior versions of the same software application component is a version of the same applicable software application component that previously passed the integration test plan for the software platform.

Returning to step 430, if the test version passed the integration test plan in step 430, the method moves to step 445 where a notification may be sent to indicate that the test version of the software platform passed the integration test plan. Such a notification may include identification of the first version of the software application component received in step 405. Notification system 111 may perform step 445 in response to data received from software platform testing system 115. Because the first version of the software application component for testing that was received in step 405 has been determined to pass the integration test plan, in step 450, the first version of the software application component received in step 405 is maintained. The first version of the software application component received in step 405 may be maintained in stored software application components database 109. The first version of the software application component received in step 405 may be maintained with one or more prior versions of the same software application component, and each of these versions of the same software application component is a version of the same applicable software application component that previously passed the integration test plan for the software platform. Thereafter, when a different software application component needs to be tested as part of the integration test plan, the first version of the software application component that passed the integration test plan may be used in step 410 as one of the other software application components used in testing of the different software application component. In some configurations, when a version of a software application component passes the integration test plan in step 430, the version may be maintained in step 450 and any prior version may be deleted. By maintaining a most current version of a software application component that passed the integration test plan, stored software application components database 109 does not need to maintain multiple versions of the software application component that have passed.

Figure 5:
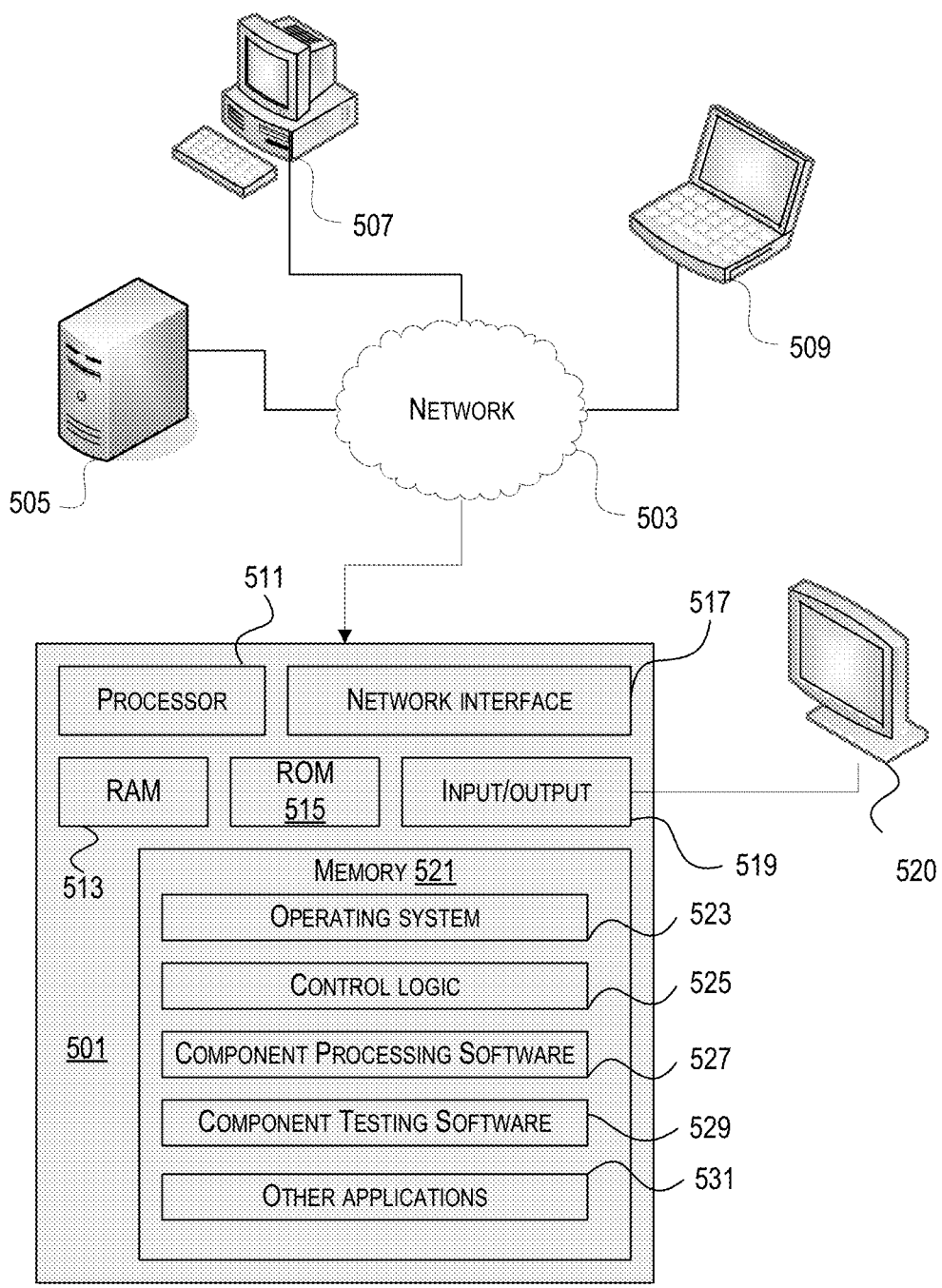
FIG. 5 depicts an example of a computing device that may be used in implementing one or more aspects described herein.

FIG. 5 illustrates one example of a computing device 501 that may be used to implement one or more illustrative aspects discussed herein. For example, computing device 501 may, in some embodiments, implement one or more aspects of the disclosure by reading and/or executing instructions and performing one or more actions based on the instructions. Computing device 501 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 501 may, in some embodiments, operate in a standalone environment. In others, computing device 501 may operate in a networked environment. As shown in FIG. 5, various network nodes 501, 505, 507, and 509 may be interconnected via a network 503, such as the Internet. Other networks may also or alternatively be used, including private intranets, corporate networks, LANs, wireless networks, personal networks (PAN), and the like. Network 503 is for illustration purposes and may be replaced with fewer or additional computer networks. A local area network (LAN) may have one or more of any known LAN topology and may use one or more of a variety of different protocols, such as Ethernet. Devices 501, 505, 507, 509 and other devices (not shown) may be connected to one or more of the networks via twisted pair wires, coaxial cable, fiber optics, radio waves or other communication media.

As seen in FIG. 5, computing device 501 may include a processor 511, RAM 513, ROM 515, network interface 517, input/output interfaces 519 (e.g., keyboard, mouse, display, printer, etc.), and memory 521. Processor 511 may include one or more computer processing units (CPUs), graphical processing units (GPUs), and/or other processing units. I/O 519 may include a variety of interface units and drives for reading, writing, displaying, and/or printing data or files. I/O 519 may be coupled with a display such as display 520. Memory 521 may store software for configuring computing device 501 into a special purpose computing device in order to perform one or more of the various functions discussed herein. Memory 521 may store operating system software 523 for controlling overall operation of computing device 501, control logic 525 for instructing computing device 501 to perform aspects discussed herein, component processing software 527, component testing software 529, and other applications 531. Control logic 525 may be incorporated in and may be a part of component processing software 527. In other embodiments, computing device 501 may include two or more of any and/or all of these components (e.g., two or more processors, two or more memories, etc.) and/or other components and/or subsystems not illustrated here.

Devices 505, 507, 509 may have similar or different architecture as described with respect to computing device 501. Those of skill in the art will appreciate that the functionality of computing device 501 (or device 505, 507, 509) as described herein may be spread across multiple data processing devices, for example, to distribute processing load across multiple computers, to segregate transactions based on geographic location, user access level, quality of service (QoS), etc. For example, devices 501, 505, 507, 509, and others may operate in concert to provide parallel computing features in support of the operation of control logic 525, component processing software 527, and/or component testing software 529.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Although the subject matter has been described in language specific to structural features and/or methodological acts, it is to be understood that the subject matter defined in any claim is not necessarily limited to the specific features or acts described above. Rather, the specific features and acts described above are disclosed as example forms of implementing any claim or any of the appended claims.

What is claimed is:

1. A method comprising:
   prior to receiving a first version of a first software application of a software platform, receiving, by a computing device, a prior version of the first software application of the software platform and combining the prior version of the first software application and a stored version of a second software application of the software platform to generate a passed version of the software platform;
   receiving, by the computing device, the first version of the first software application of the software platform;
   combining the first version of the first software application and the stored version of the second software application of the software platform to generate a test version, wherein the stored version of the second software application previously passed a first sequence of test steps defined in an integration test plan;
   performing the first sequence of test steps defined in the integration test plan on the combined test version;
   determining whether the test version passed the first sequence of test steps defined in the integration test plan; and
   based on determining that the test version failed the first sequence of test steps:
      sending, to a second computing device, a notification of the first version of the first software application failing the first sequence of test steps defined in the integration plan; and
      maintaining the prior version of the first software application of the software platform, wherein the prior version of the first software application previously passed the first sequence of test steps defined in the integration test plan.

2. The method of claim 1, further comprising: prior to receiving the first version of the first software application, receiving, by the computing device, the stored version of the second software application.

3. The method of claim 1, further comprising: prior to receiving the prior version of the first software application, performing a second sequence of test steps defined in the integration test plan on the passed version of the software platform.

4. The method of claim 3, further comprising: storing the prior version of the first software application as a stored version of the first software application, wherein the stored version of the first software application passed the second sequence of test steps defined in the integration test plan.

5. The method of claim 3, further comprising: upon passing the second sequence of test steps defined in the integration plan, maintaining the stored version of the second software application.

6. The method of claim 1, further comprising:
   receiving, by the computing device, a first version of a third software application of the software platform,
   wherein the combining the first version of the first software application and the stored version of the second software application comprises combining the first version of the first software application, the stored version of the second software application, and the first version of the third software application to generate the test version.

7. The method of claim 6, further comprising based on the determining that the combined test version failed the first sequence of test steps, maintaining the third software application as a stored version of the third software application.

8. The method of claim 7, wherein the first version of the third software application previously passed the first sequence of test steps defined in the integration test plan.

9. The method of claim 6, further comprising based on the determining that the combined test version failed the first sequence of test steps, sending, to a third computing device, a notification of the first version of the third software application failing the first sequence of test steps defined in the integration plan.

10. The method of claim 1, wherein the notification comprises data on a first test step of the first sequence of test steps that the first version of the first software application failed.

11. An apparatus comprising,
   one or more processors; and
   memory storing instructions that, when executed by the one or more processors, cause the apparatus to perform:
      prior to receiving a first version of a first software application of a software platform, receive a prior version of the first software application of the software platform and combine the prior version of the first software application and a stored version of a second software application of the software platform to generate a passed version of the software platform;
      receive the first version of the first software application of the software platform;
      combine the first version of the first software application and the stored version of the second software application of the software platform to generate a test version, wherein the stored version of the second software application previously passed a first sequence of test steps defined in an integration test plan;
      perform the first sequence of test steps defined in the integration test plan on the combined test version;
      determine whether the combined test version passed the first sequence of test steps defined in the integration plan; and
      based on determining that the combined test version failed the first sequence of test steps:

send, to a second apparatus, a notification of the first version of the first software application failing the first sequence of test steps defined in the integration plan; and maintain the prior version of the first software application of the software platform, wherein the prior version of the first software application previously passed the first sequence of test steps defined in the integration test plan.

12. The apparatus of claim 11, wherein the memory storing instructions that, when executed by the one or more processors, cause the apparatus to:

prior to receiving the prior version of the first software application, perform a second sequence of test steps defined in the integration test plan on the passed version of the software platform; and store the prior version of the first software application as a stored version of the first software application, wherein the stored version of the first software application passed the second sequence of test steps defined in the integration test plan.

13. The apparatus of claim 11, wherein the memory storing instructions that, when executed by the one or more processors, cause the apparatus to:

prior to receiving the prior version of the first software application, perform a second sequence of test steps defined in the integration test plan on the passed version of the software platform;

based on determining that the passed version of the software platform passed the second sequence of test steps, maintaining the stored version of the second software application.

14. The apparatus of claim 11, wherein the memory storing instructions that, when executed by the one or more processors, cause the apparatus to:

receive, a first version of a third software application of the software platform, wherein the combine the first version of the first software application and the stored version of the second software application comprises combine the first version of the first software application, the stored version of the second software application, and the first version of the third software application to generate the test version, wherein the first version of the third software application previously passed the first sequence of test steps defined in the integration test plan.

15. One or more non-transitory computer-readable media comprising instructions that, when executed by a computing system, cause the computing system to:

maintain a first version of a first software application of a software platform;

receive a second version of the first software application of the software platform;

combine the second version of the first software application and a plurality of software applications to generate a first test version, wherein each of the plurality of software applications previously passed a first sequence of test steps defined in an integration test plan;

perform the first sequence of test steps defined in the integration test plan on the first test version;

determine whether the first test version passed the first sequence of test steps defined in the integration plan;

based on determining that the first test version failed the first sequence of test steps:

send a notification of the second version of the first software application failing the first sequence of test steps defined in the integration plan; and maintain the plurality of software applications and the first version of the first software application;

receive a third version of the first software application of the software platform;

combine the third version of the first software application and the plurality of software applications to generate a second test version;

perform a second sequence of test steps defined in the integration test plan on the second test version; and based on determining that the second test version passed the second sequence of test steps:

store the third version of the first software application; and delete the first version of the first software application.

16. A method comprising:

receiving, by a computing device, a first version of a first software application of a software platform;

receiving, by the computing device, a first version of a second software application of the software platform;

combining the first version of the first software application, the first version of the second software application, and a stored version of a third software application of the software platform to generate a test version, wherein the stored version of the third software application previously passed a first sequence of test steps defined in an integration test plan;

performing the first sequence of test steps defined in the integration test plan on the test version;

determining whether the test version passed the first sequence of test steps defined in the integration test plan; and based on determining that the test version failed the first sequence of test steps:

sending, to a second computing device, a notification of the first version of the first software application failing the first sequence of test steps defined in the integration plan; and maintaining a prior version of the first software application of the software platform, wherein the prior version of the first software application previously passed the first sequence of test steps defined in the integration test plan.

17. The method of claim 16, further comprising: prior to receiving the first version of the first software application, receiving, by the computing device, the stored version of the third software application.

18. The method of claim 16, further comprising based on determining that the test version failed the first sequence of test steps, maintaining stored version of the third software application.

19. The method of claim 16, further comprising based on determining that the test version failed the first sequence of test steps, sending, to a third computing device, a notification of the first version of the second software application failing the first sequence of test steps defined in the integration plan.

20. An apparatus comprising, one or more processors; and memory storing instructions that, when executed by the one or more processors, cause the apparatus to:

receive a first version of a first software application of a software platform;

receive a first version of a second software application of the software platform, wherein the first version of the second software application previously passed a first sequence of test steps defined in an integration test plan;

combine the first version of the first software application, the first version of the second software application, and a stored version of a third software application of the software platform to generate a test version, wherein the stored version of the third software application previously passed the first sequence of test steps defined in the integration test plan;

perform the first sequence of test steps defined in the integration test plan on the combined test version;

determine whether the combined test version passed the first sequence of test steps defined in the integration plan; and based on determining that the combined test version failed the first sequence of test steps:
    send, to a second apparatus, a notification of the first version of the first software application failing the first sequence of test steps defined in the integration plan; and
    maintain a prior version of the first software application of the software platform, wherein the prior version of the first software application previously passed the first sequence of test steps defined in the integration test plan.

* * * * *